(12) United States Patent
Johnson

(10) Patent No.: US 6,921,244 B2
(45) Date of Patent: Jul. 26, 2005

(54) BLEED VALVE SYSTEM

(76) Inventor: David L. Johnson, 110 Edwards Rd., Parsippany, NJ (US) 07058

(*) Notice: Subject to any disclaimer, the term of this patent is extended or adjusted under 35 U.S.C. 154(b) by 158 days.

(21) Appl. No.: 10/309,809

(22) Filed: Dec. 4, 2002

(65) Prior Publication Data
US 2003/0129052 A1 Jul. 10, 2003

Related U.S. Application Data
(60) Provisional application No. 60/336,619, filed on Dec. 4, 2001.

(51) Int. Cl.[7] .................................. F01B 25/00
(52) U.S. Cl. ..................... 415/26; 415/28; 415/144; 415/145
(58) Field of Search ..................... 415/17, 28, 26, 415/27, 29, 47, 49, 1, 144, 145

(56) References Cited

U.S. PATENT DOCUMENTS
4,550,564 A * 11/1985 Callahan et al. ......... 60/39.093

* cited by examiner

Primary Examiner—Edward K. Look
Assistant Examiner—Dwayne White
(74) Attorney, Agent, or Firm—Edwards & Angell, LLP; David G. Conlin; Richard J. Roos

(57) ABSTRACT

Disclosed is a system for operating gas turbine engine bleed valves in response to pressure values within the engine, wherein the engine pressure values are sensed electronically and routed to a programmable logic device, and wherein the programmable logic device control the opening and closing of the bleed valves in a manner that allows for reduced engine vibration with minimal loss of engine efficiency.

6 Claims, 9 Drawing Sheets

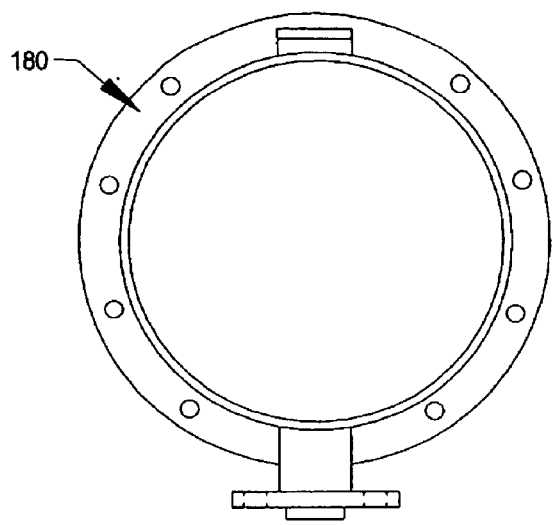 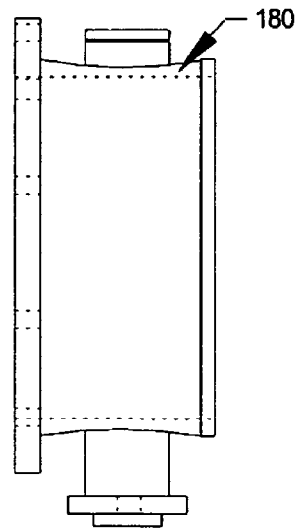
FIG. 5A  FIG. 5B
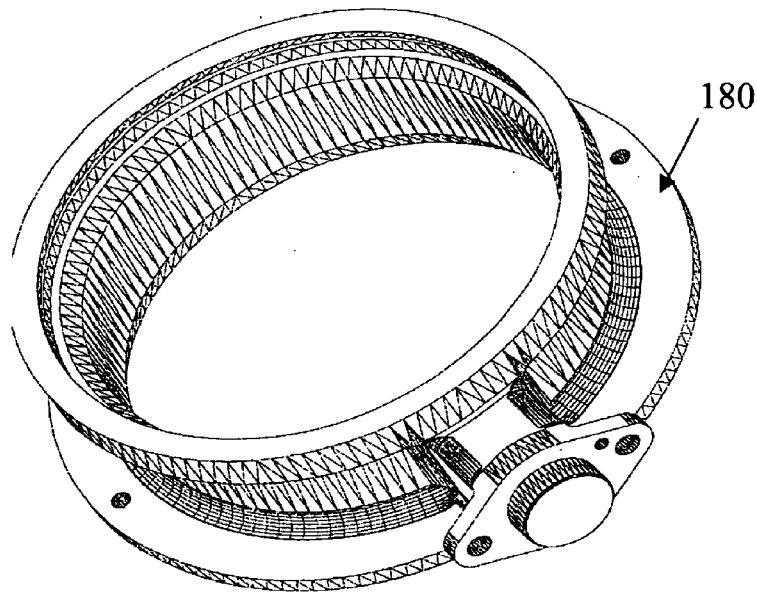
FIG. 5C

BLEED VALVE SYSTEM

CROSS REFERENCE TO RELATED APPLICATION

This application claims priority from, and incorporates by reference the entirety of U.S. Provisional Patent Application Ser. No. 60/336,619, which was filed on Dec. 4, 2001.

BACKGROUND OF THE INVENTION

1. Field of the Invention

The present invention relates to industrial machinery, and, in particular, to industrial gas turbines and operation thereof. More particularly, the present invention provides a sys tem for electronically controlling the operation of gas turbine engine bleed valves.

2. Description of Related Art

Gas turbines serve a variety of important purposes (e.g., generating electricity; pumping oil; compressing natural gas, turning a ship's propeller), and operate by converting thrust power into shaft or rotary power to turn or "drive" one or more pieces of industrial machinery.

The engine of a gas turbine is a rotary or axial type engine that spins around a common shaft located in the center of the engine. Several sections comprise the engine along that shaft, including a compressor section, a combustion section and a turbine section.

The compressor section is the front-most section of the gas turbine engine, and is comprised of a plurality of bladed disks that compress inlet air, which generally is supplied to the compressor section as air from the outer vicinity of the compress or (e.g., outside air). The compressor section of the gas turbine engine is divided into two related, but separate parts—a low-pressure compressor, and a high-pressure compressor, which act in concert to compress the supplied air, and to direct the compressed air to the adjacent combustion section of the gas turbine engine.

In the combustion section of the gas turbine engine, the compressed air that is received from the compressor section is mixed with fuel and then ignited to create expanding gases, which, in turn, are directed/fed into the turbine section of the gas turbine engine.

The turbine section of the gas turbine engine includes a plurality of wheeled blades, which comprise high and low turbines that are turned by the hot expanding gases from the combustion section. The high and low turbines drive the low- and high-pressure compressors through the action of common shafts, thus creating and maintaining a continuous combustion cycle of the gas turbine engine.

There are several problems with conventional rotary gas turbine engines—especially twin axial compressor type engines—that arise during the acceleration and deceleration of the engine, most notably a mechanical lag/delay between the high and low turbine sections that are being driven by the expanding combustion gases.

This momentum delay causes the high- and low-pressure compressors to turn at different rates, and that, in turn, has the effect of trapping unused compressed air between the low- and high-pressure compressors. This trapped air condition—if unalleviated—will partially or completely halt the rotation of the compressor blades, thus causing the engine to undergo "compressor stall." Compressor stall, in turn, causes associated engine vibration, which, if recurrent, will ultimately lead to compressor and/or engine failure.

Those in the art have routinely installed so-called "bleed valves" (or some other like mechanism/equipment) between the low-pressure and high-pressure compressor sections of the gas turbine engine. In general, a bleed valve is a valve or series of valves mounted to the compressor section of the gas turbine engine and operated to "bleed away" excessive compressor air, thus at least minimizing (if not entirely avoiding) the occurrence of "compressor stall."

During operation of a bleed valve system, one or more bleed valves open in order to bleed off some of the "stalled" air and to smooth the vibration of the gas turbine engine that is caused by the compressor having stalled during acceleration and deceleration of the engine. The bleed valves then close once the engine has reached a constant speed, thus allowing the engine to resume operation at or closer to maximum efficiency.

Conventional industrial gas turbine engine bleed valve systems (e.g., the Pratt & Whitney GG4 system) are modeled after valve systems used in jet engines of airplanes. In both settings, the systems are comprised of pneumatically actuated valves that open and close in response to different pressures.

To enable this to occur, pressure sensing lines supply compressor air to bleed valve actuators, and an internal pressure valve assembly senses the compressor air pressure and controls the actuators, which are prompted to move back and forth, causing the bleed valves to open or close. A valve assembly (i.e., a damper) mounts above an opening between the high- and low-pressure compressors. When the valve assembly is open, it allows excess air to bleed from between the high- and low-pressure compressors, after which it closes to allow the compressors (and, thus, the engine) to operate at or closer to maximize efficiency.

Existing bleed valve systems are generally comprised of a plurality of bleed valves (usually three bleed valves—a left bleed valve, a center bleed valve, and a right bleed valve), which are mechanically set to operate at different pressures, and which are controlled by respective bleed valve actuators. The actuators include internal valves that sense the pressure (which is mechanically set with springs and shims) of the compressor air supplied from the pressure sensor lines, and open or close the actuators to operate the attached butterfly valve.

If the opening and closing of each bleed valve is timed correctly, incorporation of the bleed valve system within the gas turbine engine should be effective to smooth the vibration of the gas turbine engine, yet not compromise the engine's operating efficiency.

However, although conventional gas turbine engine bleed valve systems have proven effective to at least somewhat smooth the vibration of gas turbine engines, the timing of the opening and closing of the various bleed valves has not allowed for an ideal balance between smooth vibration and engine efficiency.

Another shortcoming of conventional gas turbine engine bleed valve systems stems from the fact that although their design is similar to that of valve systems used in connection with flight jet engines, their usage environment is very different. Specifically, whereas flight jet engines are operated primarily at altitudes thousands of feet above sea level, where the air is both dry and clean (and, thus, compressible), gas turbine engines are operated at or below sea level, where the air is generally unclean and moisture-laden (and, thus, incompressible).

Over time, circulation of moisture-laden, incompressible air through a gas turbine engine compressor and into a series of bleed valves will result in degradation of the bleed valves, which, in turn, will either require costly repair of the bleed valves, or, if unnoticed, will cause premature valve failure. In a similar vein, the dirt and moisture contained in the air can cause friction, which, in turn, can necessitate costly repair, or lead to failure of the springs, shims and/or spacers that comprise the pressure actuators and enable them to function properly.

Therefore, a need exists for an improved bleed valve system that enables a more streamlined, optimal operation of the bleed valves that are incorporated within a gas turbine engine, yet that can be utilized in connection with existing gas turbine engines. A further need exists for such a system to be operable in a wide variety of usage environments—even those where the outside air is polluted, dirty and/or moisture-laden—without fear of necessitating expedited repair of the system's components and/or shortening the lifetime of the system.

SUMMARY OF THE INVENTION

The present invention provides a system that enables or facilitates operation (and adjustment during operation) of gas turbine engine bleed valves via the interrelationship between the components of the system and a programmable logic device. In particular, the system of the present invention optimizes the operation (i.e., the opening and closing) of bleed valves by utilizing a control device (e.g., a programmable logic device), which sends signals to open or close the bleed valves based on electronically measured/sensed pressure values within a gas turbine engine. As such, the system of the present invention differs from conventional systems, which utilize mechanical means to control how and when bleed valves open and close.

The pressure of the engine is sensed by the programmable logic device due to the interrelationship of several components of the system.

For example, a plurality of pressure sensing lines are in communication with an engine (e.g., a gas turbine engine) that is housed within an engine containment cell and a pressure-sensing manifold that is housed within a control cabinet. The pressure-sensing manifold distributes the pressure within the engine through one or more pressure transducers, which, in turn, send readable electronic signals representative of the engine pressure to a programmable logic device (e.g., computer).

The programmable logic device also controls operation of the bleed valves/dampers incorporated within the system.

In order to open or close the one or more of the bleed valves of the system, the programmable logic device will send a signal to a control valve manifold (e.g., a pneumatic solenoid control valve manifold) to cause one or more solenoid valves in the pneumatic control valve manifold to open or close. The opening or closing of the each solenoid valve will provide pneumatic pressure (in the form of station air) to a corresponding bleed valve actuator, thus causing the bleed valve(s) to open or close.

Each bleed valve is mounted within a housing, in which is placed a disk/flapper, which is centered about a valve shaft that is supported by bearing mounts/supports. The disk is fitted within its respective housing to prevent air from flowing between the disk and the housing (i.e., to maintain an air-tight fitting) when the valve is in the "closed" position, yet to allow air to flow through the valve when the valve is in the "open" position.

To effect opening and closing of each bleed valve, its respective shaft is in communication with an actuator such that the actuator turns the shaft 90° to open the valve, and then returns the valve to 0° to close the valve. In an exemplary embodiment of the present invention, each actuator is a positive displacement, rack and pinion type 90° degree actuator.

In an exemplary embodiment of the present invention the system includes a tethering harness, which protects the pneumatic pressure sensing lines as well as electrical leads and pneumatic actuation lines to and from the actuators and control cabinet within which the programmable logic device generally is housed.

The opening or closing of each solenoid valve will provide pneumatic pressure (in the form of station air) to a corresponding bleed valve actuator, thus causing the bleed valve(s) to open or close. Preferably, but not necessarily, the station air is supplied to the system as dry, clean, filtered air, wherein the air passes through a filter regulator, the output of which is routed to the solenoid valve manifold.

In the event that station air pressure is lost, the programmable logic device will sense that condition and will trigger stoppage of the engine, and will cause activation of a reserve energy storage system/device (e.g., an uninterrupted power supply) to accomplish engine trip sequencing.

Thus, the system enables engine pressure values to be monitored by the programmable logic device, which, based on those values, controls the one or more of the bleed valves (i.e., opens or closes the one or more bleed valves).

The programmable logic device operates by comparing input signals against inputted or stored parameters. This comparison can be made as is generally known in the art, e.g., via stored ladder logic. The programmable logic device then causes an appropriate response to occur based on this comparison. To accomplish this, the programmable logic device executes one or more application programs (e.g., software) that will, at minimum, control the opening and closing of the bleed valve as described above in response to certain programmed conditions/events.

The application program(s) for execution in the programmable logic device call for the programmable logic device to read and interpret signals from the sensors and other system devices, and to compare the values represented by those signals with protocol values (e.g, preset limits) stored in a memory (e.g., a flash or non-volatile type of memory, as is known to those of ordinary skill in the art) of the programmable logic device. In response, the application program(s) prompt the programmable logic device to send signals to control and operate the various valves, alarms, and or actuators that comprise the system.

The application program(s) more specifically include instructions and criteria to query of certain criteria (e.g., the inputs from the system sensors or other signals), and to compare them to stored levels/values. Based on this comparison, the programmable logic device—more specifically, the application program(s) being executed therein—will cause the system to respond as programmed or in a predetermined fashion.

In further aspects of the invention, the programmable logic device also includes a user interface, which a system operator can view and can utilize to change system operation parameters, e.g., the threshold pressure value(s). Optionally, but also preferably, the control cabinet in which the programmable logic device is located also includes a cabinet cooling system.

The application program(s) being executed by the programmable logic device are configured so the programmable logic device has several different modes of operation, including but not limited to "Standard Operation," "Water Wash," and "Maintenance and Test Operation" modes.

Preferably, the control cabinet in which programmable logic device is housed is located outside of the engine containment cell. This, in turn, ensures that the programmable logic device is separated from any engine vibration, and also allows the programmable logic device to be located close to the various sensors/transducers that feed it information via signals.

The system of the present invention also may be utilized in connection with a twin-pack (i.e., two engine) system.

Still other aspects, embodiments and advantages of the present invention are discussed in detail below.

BRIEF DESCRIPTION OF THE DRAWINGS

For a fuller understanding of the nature and desired objects of the present invention, reference is made to the following detailed description taken in conjunction with the accompanying figures, wherein like reference characters denote corresponding parts throughout the several illustrated views, and wherein:

FIGS. 5A–5E are front (FIG. 5A), side (FIG. 5B) and perspective (FIG. 5C) views of the bleed valve housing of the bleed valve of FIGS. 4A and 4B, and front (FIG. 5D) and side (FIG. 5E) views of the disk and shaft combination of the bleed valve of FIGS. 4A and 4B;

DETAILED DESCRIPTION OF THE INVENTION

The present invention provides a system that enables or facilitates operation (and adjustment during operation) of gas turbine engine bleed valves via the interrelationship between the components of the system and a programmable logic device.

In particular, the system 10 (see FIGS. 1 and 2) of the present invention optimizes the operation (i.e., the opening and closing) of bleed valves by utilizing a programmable logic device, which sends signals to open or close the bleed valves based on electronically measured/sensed pressure values within a gas turbine engine. As such, the system 10 of the present invention differs from conventional systems, which utilize mechanical means to control how and when bleed valves open and close.

Figure 1:
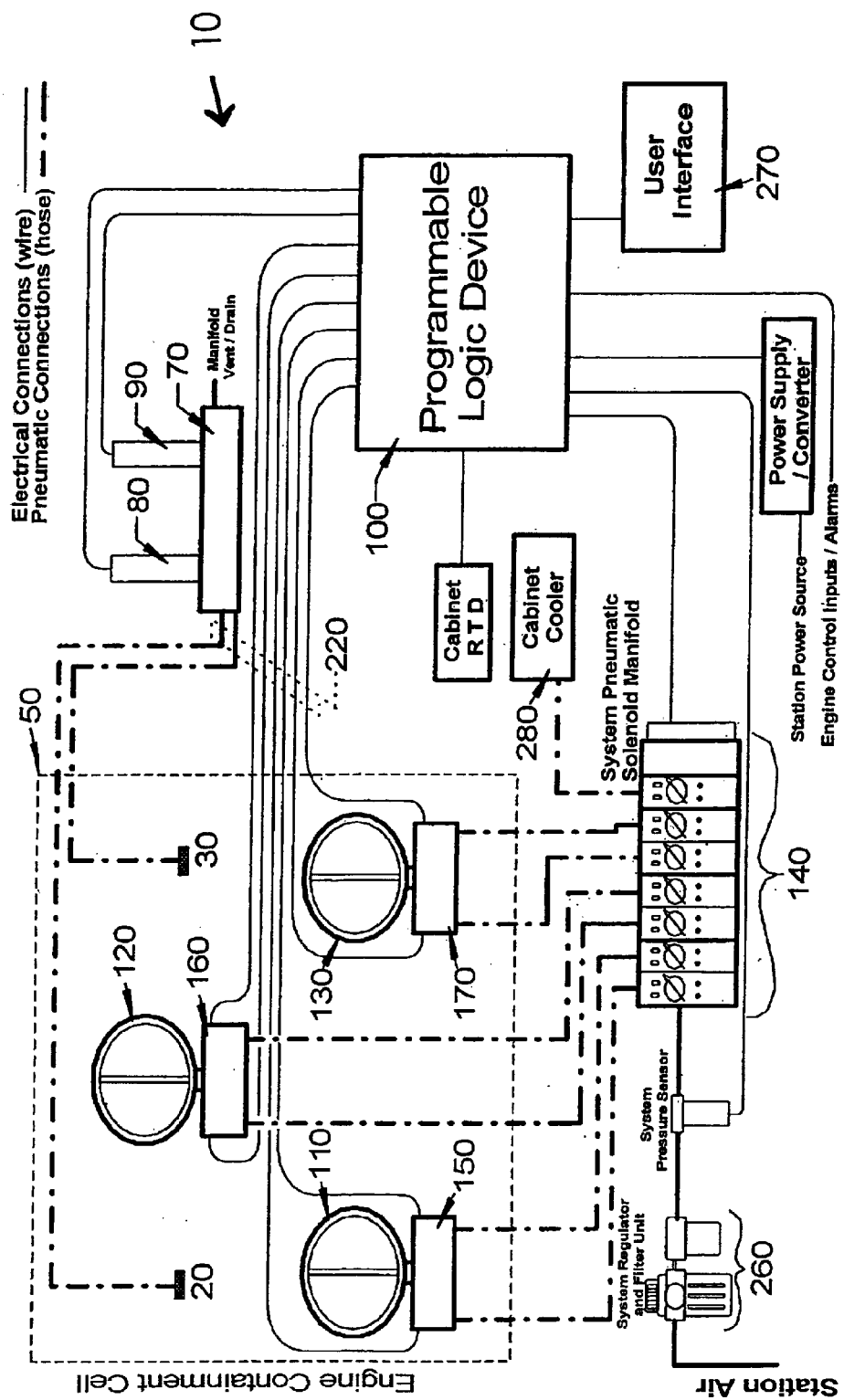
FIGS. 1 and 2 are schematic views of an exemplary embodiment of a system of the present invention.

The pressure of the engine is sensed by the programmable logic device due to the interrelationship of several components of the system. As shown in FIG. 1 and, in particular, FIG. 2, a plurality of pressure sensing lines 20, 30 are in communication with an engine 40 (e.g., a gas turbine engine) that is housed within an engine containment cell 50.

Figure 3A:
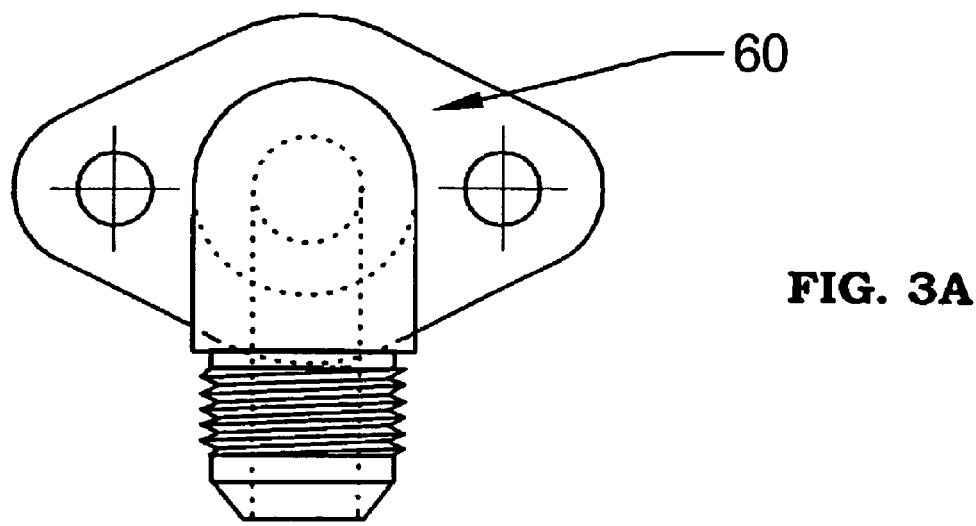
FIGS. 3A and 3B are front (FIG. 3A) and side (FIG. 3B) views of an adapter that can be used to place a pressure sensing line into communication with a gas turbine engine.
Figure 3B:
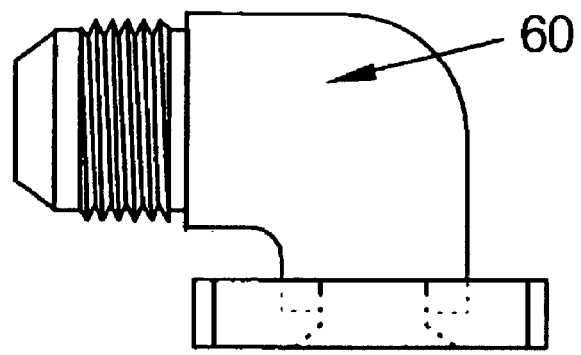

The connection between the pressure sensing lines 20, 30 and the engine 40 can be accomplished using any number of techniques known in the art, e.g., by connecting each sensing line to a compressor port (not shown) of the engine. In an exemplary embodiment of the present invention, one end of each pressure sensing line 20, 30 is placed into communication with the engine 40 by being bolted to the flanges of the existing engine outlet ports, e.g., through the use of an adapter 60 (See FIGS. 3A and 3B).

The other end of each pressure sensing line is connected (e.g., directly or through the use of an adapter) to a pressure-sensing manifold 70, which is a pressure chamber into which each pressure sensing line feeds air pressure. The pressure-sensing manifold 70 distributes the pressure within the engine 40 through one or more pressure transducers 80, 90, which, in turn, send readable electronic signals representative of the engine pressure to a programmable logic device 100 (e.g., a microprocessor control processing unit).

The number, design and/or dimensions of the pressure sensing lines 20, 30 vary depending upon the particular application. In an exemplary embodiment of the present invention, the lines are non-rigid, so as to minimize or eliminate undesirable vibration encountered during normal or abnormal operation of the engine.

By way of non-limiting example, two pressure sensing lines 20, 30 may be utilized, each of which is a braided hose that is made of a metal-based material (e.g., stainless steel), and is lined with a flexible polymer (e.g., polytetrafluoroethylene).

Preferably, the system 10 includes more than one pressure transducer 80, 90 for purposes of redundancy—that is, more than one transducer is included within the system in order to send (to the programmable logic device 100) more than one set of electronic signals indicating the measurement of the pressure within the engine 40. In an exemplary embodiment of the present invention, the system 10 includes two pressure transducers 80, 90.

Optionally (but preferably) the programmable logic device 100 is configured and arranged such that the pressure signals from each of the pressure sensing lines 20, 30 (as sent to the programmable logic device via the pressure transducers 80, 90) are compared with predetermined values when received. In accordance with such an embodiment, if the differential pressure between the two pressure signals exceeds a predetermined (i.e., as an input parameter) level, and/or should one of the sensors fail to send a pressure value signal, the programmable logic device can (and, preferably, will) cause a visible alarm signal or code to be displayed on a user interface screen 270 and, optionally, will also place the system into a pressure sensor alarm mode of operation.

The programmable logic device 100 also is configured and arranged so as to control operation of the bleed valves 110, 120, 130 incorporated within the system 10. The term bleed valve is to be interpreted as having its ordinary meaning in the art, and is specifically meant to encompass both bleed valves and dampers.

In order to open or close the one or more of the bleed valves 110, 120, 130 of the system, the programmable logic device 100 sends signal to a control valve manifold 140 (e.g., a pneumatic solenoid control valve manifold) to cause one or more solenoid valves (such as VQ series solenoid valves commercially available from SMC Corporation of Indianapolis, Ind., USA) in the pneumatic control valve manifold to open or close. The opening or closing of the each solenoid valve 140 will provide pneumatic pressure (in the form of station air) to a corresponding bleed valve actuator 150, 160, 170, thus causing the bleed valve(s) to open or close.

The connection between the programmable logic device 100 and the pneumatic control valve 140 can comprise any number or technologies, devices or mechanisms generally known in the art and appropriate for the application. In an exemplary embodiment of the present invention, a so-called "D-sub" connector shielded cable provides control wiring between the programmable logic device and the pneumatic control valve.

Optionally, but preferably, each bleed valve 110, 120, 130 is in communication with one or more high temperature position indicators (not shown) that provide the system with a feed back of the operation and functionality of each bleed valve.

When the programmable logic device 100 outputs signals for the pneumatic control valve 140 to open a solenoid to provide pressure to the actuator and to open the bleed valve 110, 120, 130, the programmable logic device checks whether the bleed valve(s) have failed to properly operate (e.g., open, close, etc.) For example, if any of the bleed valves 110, 120, 130 that were supposed to open did not—in fact—open, the programmable logic device 100 senses this condition and sends signals to place the system into alarm, and to cause another one or more of the other bleed valves to open. The alarm provides visual and/or aural indications (e.g., a visual indication that appears on a user interface 270 of the programmable logic device 100) indicating that one or more bleed valves 110, 120, 130 have failed to operate properly, and further indicating which specific bleed valve(s) have failed to operate properly.

In the event that all of the bleed valves 110, 120, 130 are non-functioning/inoperable, the programmable logic device 100 senses this condition, and provides an engine trip signal. The engine trip signal causes all of the bleed valves 110, 120, 130 to open, and/or causes the engine 40 to stop operation.

Figures 4A, 4B:
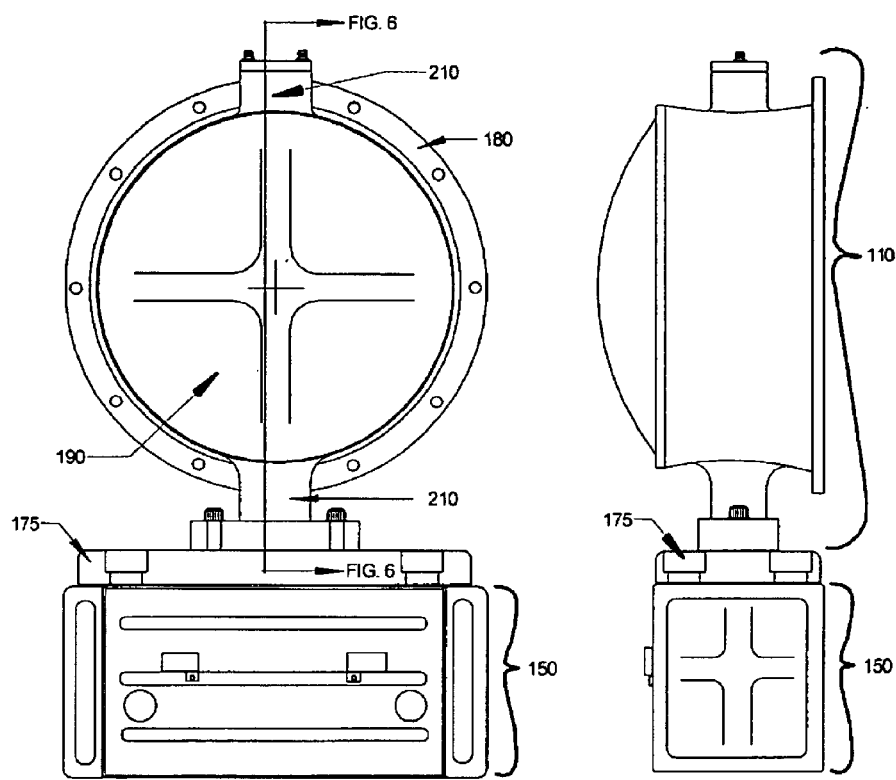
FIGS. 4A and 4B are front (FIG. 4A) and side (FIG. 4B) views of a bleed valve in communication with a bleed valve actuator.
Figure 5D:
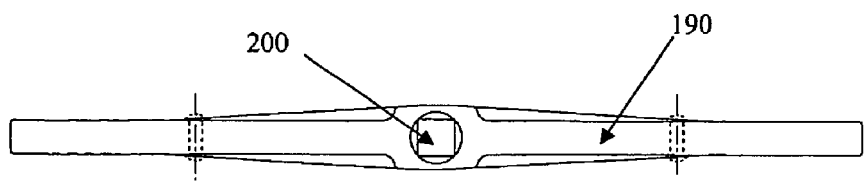
Figure 5E:
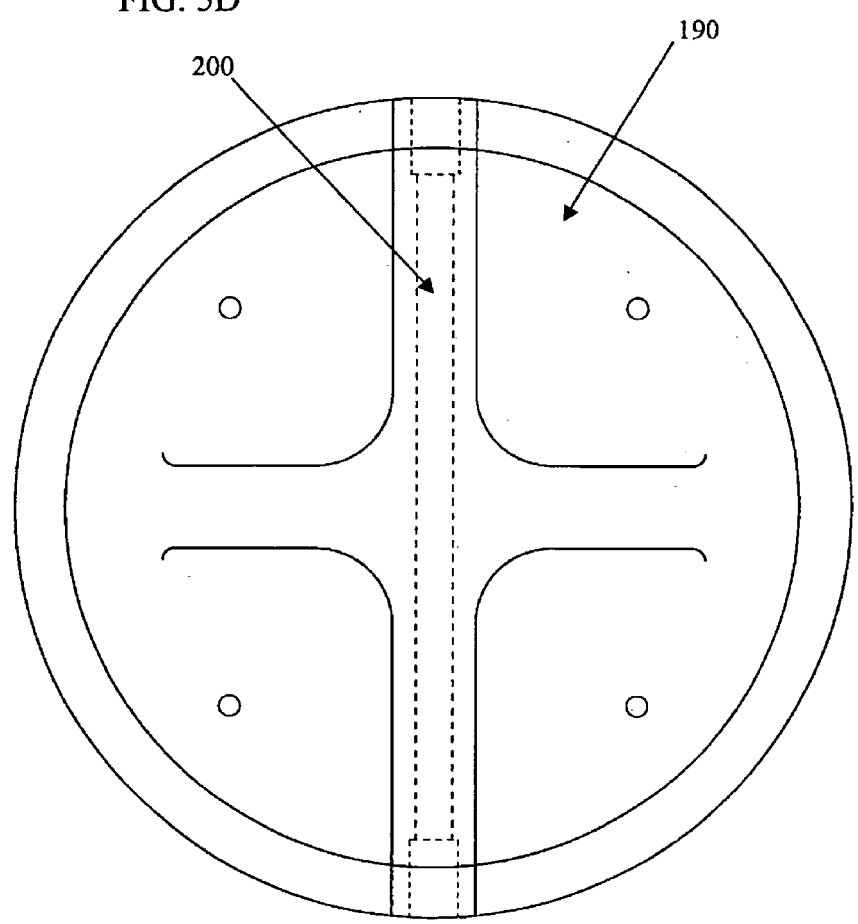
Figure 6:
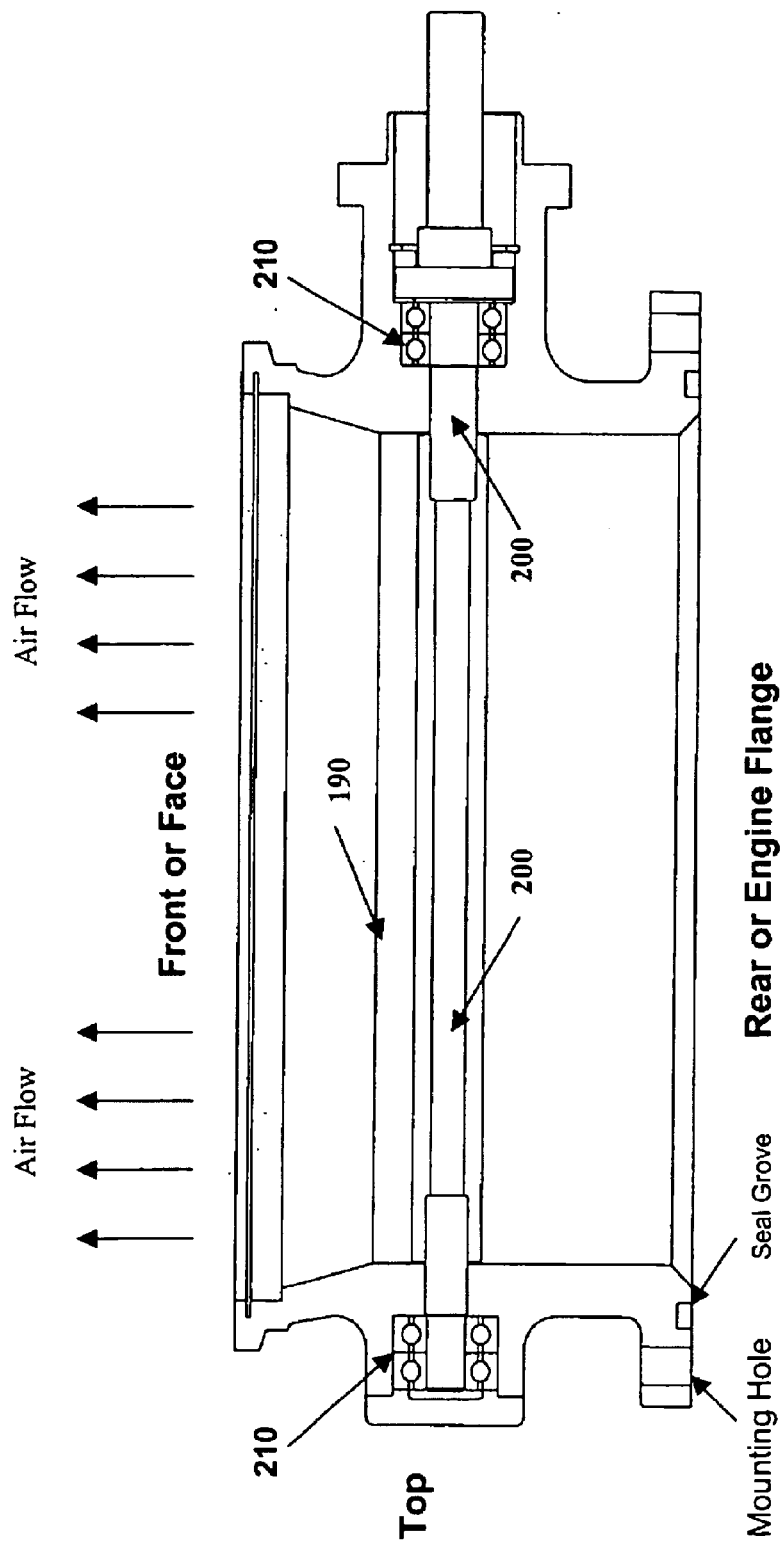
FIG. 6 is a cross-sectional view of the bleed valve of FIG. 4A taken along line FIG. 6—FIG. 6 of FIG. 4A.

The structural interrelationship between a bleed valve 110, 120, 130 and its respective actuator 150, 160, 170 is shown by reference to FIGS. 4A, 4B, which depict a bleed valve 110 connected to an actuator 150, e.g, by being bolted to a mounting plate 175, which itself is bolted to the actuator.

As shown in FIGS. 5A–5E and 6, the bleed valve 110 is mounted within a housing 180, in which is placed a disk/flapper 190, which is centered about a valve shaft 200 that is supported by bearing mounts/supports 210. The disk 190 is fitted within its respective housing 180 so as to prevent air from flowing between the disk and the housing (i.e., to maintain an air-tight fitting) when the valve 110, 120, 130 is in the "closed" position, and so as to allow air to flow (see FIG. 6) through the valve when the valve is in the "open" position.

To effect opening and closing of each bleed valve 110, 120, 130, its respective shaft 200 is coupled to an actuator 150, 160, 170 such that the actuator turns the shaft in either a clockwise or counterclockwise direction to open and close the valve. In an exemplary embodiment of the present invention, the actuator 150, 160, 170 rotates the shaft 200 of the respective bleed valve 110, 120, 130 90° to open the valve, and then returns the valve to 0° to close the valve.

Figure 7A:
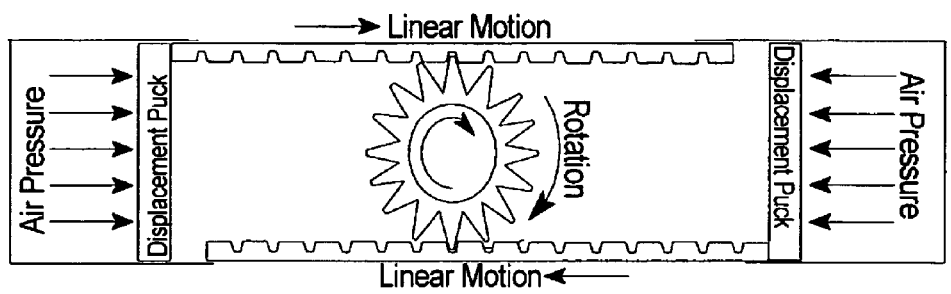
FIGS. 7A and 7B are schematic views of right-hand motion (FIG. 7A) and left-hand motion (FIG. 7B) of the actuator of FIGS. 4A and 4B.
Figure 7B:
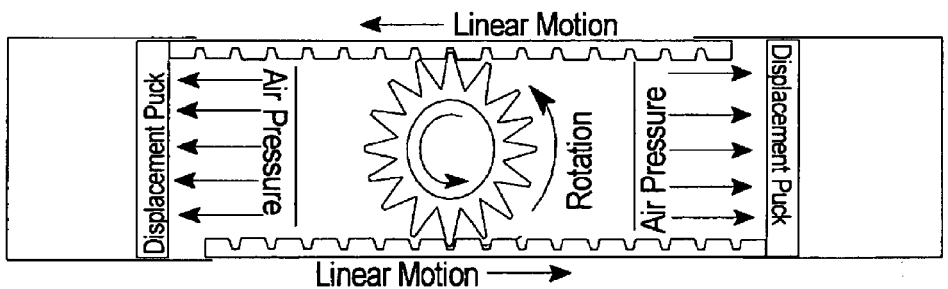

In an exemplary illustrative embodiment, each actuator 150, 160, 170 is a positive displacement, rack and pinion type 90° degree actuator, such as the type that is commercially available from SMC Corporation of Indianapolis, Ind., USA. Thus, and as is shown in FIG. 7, when air pressure (e.g., actuator fluid) is applied to one end of the actuator, its displacement puck is moved and its rack and pinion gear converts linear motion into rotary motion in order to turn or rotate the bleed valve shaft 200 so as to selectively open and close the respective bleed valve 110, 120, 130.

Figure 2:
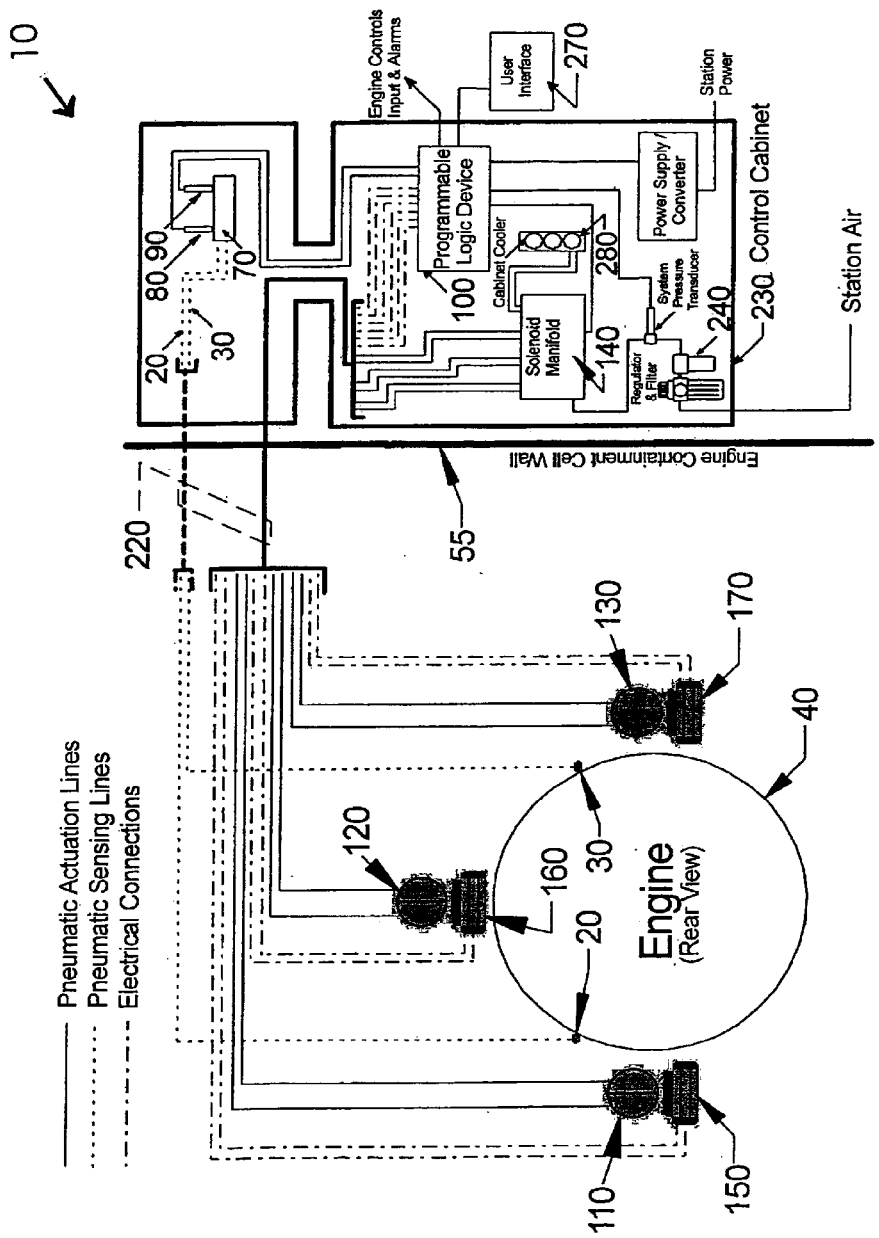

The actuator 150, 160, 170 also is equipped with high temperature position sensors (not shown) that provide a signal to the programmable logic device 100 (e.g., central processing unit) of the system, wherein that signal is indicative of the functionality of the actuator (i.e., whether the actuator is working or not) as well as the actuator's position, which, in turn, indicates the position of the bleed valve with which the actuator is in communication. As shown in FIG. 2, each actuator signal is sent via one or more electrical connections (preferably two—right and left—electrical leads) that terminate in gender correct fittings and that are in communication with the programmable logic device 100.

Each bleed valve 110, 120, 130 is attached to the engine 40 using any of a number of techniques generally known in the art, e.g., mounted over an opening between the engine's compressors (not shown), and is attached in a manner that allows excess air to bleed from between the engine's compressors (not shown) when open, but are otherwise closed to maximize (or at least increase) the efficiency of the compressors/engine by preventing air loss. In an exemplary embodiment of the present invention, each bleed valve 110, 120, 130 is bolted to intermediate case bleed valve flanges of the gas turbine engine 40 using standard double-hex head bolt and lock nut hardware.

Although the number of bleed valves 110, 120, 130 included within the system of the present invention can vary, it is currently preferred that the system includes three bleed valves (left bleed valve 110, center bleed valve 120, and right bleed valve 130 as shown in FIGS. 1 and 2). In this way, the number of bleed valves generally corresponds to the number of bleed valves for existing systems so as to allow the system of the present invention to be more easily retrofit to existing systems.

Preferably, but not necessarily, each bleed valve 110, 120, 130 is dipped in a high temperature rubberized coating prior to being installed, in order to prevent (or at least to inhibit) the loosening of its parts/components due to vibration.

Preferably, and as shown in FIGS. 1 and 2, the system 10 further includes a tethering harness 220, to protect the pneumatic pressure sensing lines 20, 30 as well as electrical leads and pneumatic actuation lines to and from the actuators 150, 160, 170 and the control cabinet 230. In an exemplary embodiment of the present invention, the control cabinet 230 is a weather-tight cabinet contained outside of the engine containment cell 50, within which the programmable logic device 100 generally is housed.

Figure 8:
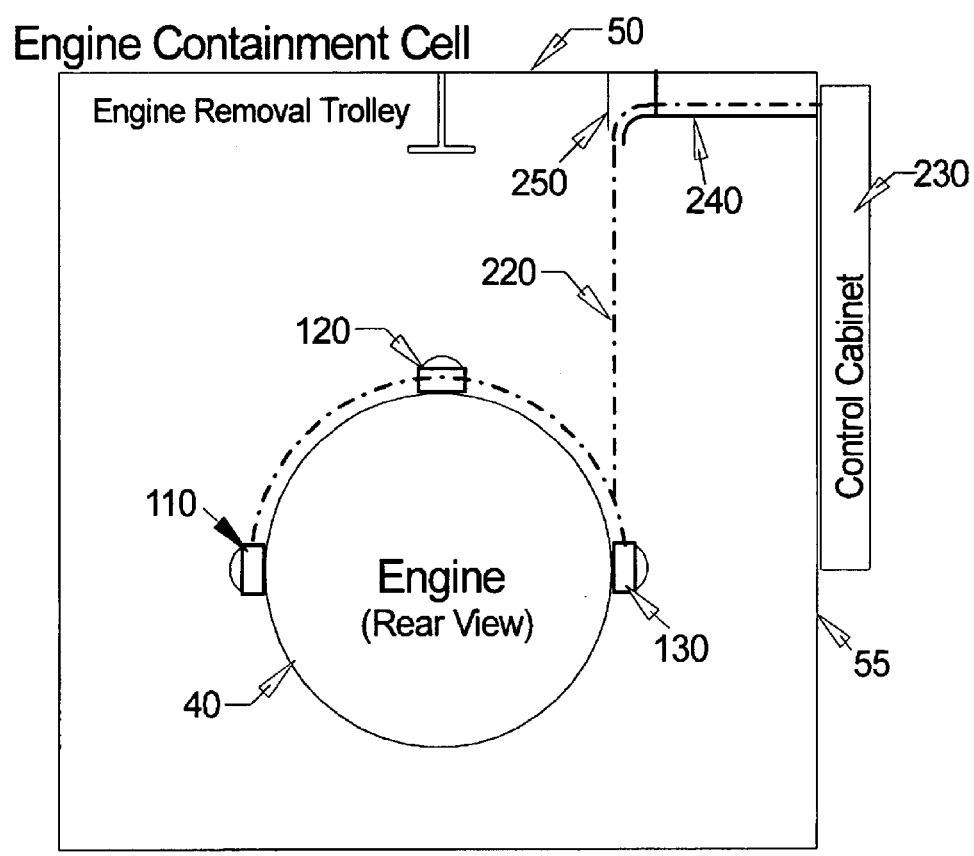
FIG. 8 is a schematic view depicting how the tethering harness assists in placing the bleed valves in communication with the control cabinet.

In an exemplary embodiment of the present invention, and as shown in FIG. 8, the tethering harness 220 attaches into bulkhead connectors (not shown) of the control cabinet 230 that protrude through the engine containment cell 50 and that run along a suspended trough 240 from the ceiling of the engine containment cell to above the engine 40. The bulkhead connectors also connect to the pneumatic control valve 140, which, as noted above, is in communication with and controlled by the programmable logic device 100.

Preferably, but not necessarily, the tethering harness 220 is hung down to the engine as is generally known in the art, e.g., through the use of a "loop-type" strain relief 250 that connects the harness to the suspending trough 240.

As noted above, the opening or closing of each solenoid valve 140 provides pneumatic pressure (in the form of station air) to a corresponding bleed valve actuator 150, 160, 170, thus causing the bleed valve(s) to open or close. Preferably, but not necessarily, the station air is supplied to the system as dry, clean, filtered air, wherein the air passes through a filter regulator 260 (see FIGS. 1 and 2), the output of which is routed to the solenoid valve manifold 140. In an exemplary embodiment of the present invention, the filter regulator is a Norgren Filter-regulator, which is commercially available from IMI Norgren Inc. of Littleton, Colo., USA. Thus, the system 10 enables engine pressure values to be monitored by the programmable logic device 100, which, based on those values, will cause one or more of the bleed valves 110, 120, 130 to open or close.

In the event that station air pressure is lost, the programmable logic device 100 senses that condition and triggers stoppage of the engine 40, and causes activation of a reserve energy storage system/device (e.g., an uninterrupted power supply) to accomplish engine trip sequencing.

The programmable logic device 100 may be a computer, a central processing unit, wireless device or comparable device now know or later developed. By way of non-limiting example, the programmable logic device 100 is a Compact-Logix 5320 model programmable logic controller, which is commercially available from Rockwell Automation (Allen-Bradley) of Milwaukee, Wis. USA, and which provides programmable machine control with a direct personal computer and network interface.

The programmable logic device 100 operates by comparing input signals (e.g., electronic signals indicative of the pressure of the engine 40, as sent via the pressure transducers 80, 90) against inputted or stored parameters. This comparison is made using any of a number of circuits and/or applications programs generally known in the art, such as, for example, via a stored ladder logic (i.e., if "x", then "y"). The programmable logic device 100 then causes an appropriate response (open or close a bleed valve, issue an alarm, store data, etc.) to occur based on the comparison.

To provide the desired operability, the programmable logic device 100 further includes one or more applications programs for execution in the programmable logic device, which applications programs or software is configured (e.g., includes instructions and criteria) that will, at minimum, allow for opening and closing of the bleed valve(s) as described above in response to certain programmed conditions/events. The application program(s) can be so-called "smart" software, wherein the application programs(s) are able to trend and quickly react and respond to changes in the pressure of the gas turbine engine's compressors. As such, the programmable logic device 100 is able to achieve an even more optimal balance between engine vibration reduction and engine operating efficiency as compared to that achieved using conventional techniques.

In an exemplary embodiment of the present invention, the programmable logic device is programmed using RSLogix 5000 software, which is commercially available from Rockwell Automation of Milwaukee, Wis. USA.

The application program(s) being executed in the programmable logic device 100 call for the programmable logic device to read and interpret signals from the sensors and other system devices, and to compare the values represented by those signals with protocol values (e.g, preset limits) stored in a memory or memory element of the programmable logic device. In an exemplary embodiment of the present invention, the memory is any number of memory devices or chips known to those of ordinary skill in the art that are appropriate for this intended use. In an illustrative embodiment, such memory comprises flash, NVRAM and EEPROM types of memory elements.

In response, the application program(s) output signals that prompt the programmable logic device 100 to send signals to control and operate the various valves, alarms, and or actuators that comprise the system.

Exemplary RSlogix 500 software code is included herein as APPENDIX A, which appendix is incorporated in its entirety into this application.

The application program(s) executed within the programmable logic device 100 of the system 10 more particularly include instructions and criteria so as to query certain criteria (e.g., the inputs from the system sensors or other signals), and to compare the certain criteria to stored levels/values. Based on this comparison, the programmable logic device 100 more specifically, the application program(s) being executed within the programmable logic device—causes the system 10 to generate or take an appropriate response, such as causing one or more of the bleed valves 110, 120, 130 to open or close, causing engine override, or causing the system to enter into alarm mode, etc.

By way of non-limiting example, the programmable logic device 100 receives signals—from the pressure transducers 80, 90 by way of the pressure manifold 70 and the pressure sensing lines 20, 30—indicative of the engine pressure, and compares the received signals to stored threshold valve pressure value(s), for example, 110 psi. If the received signals indicate that the engine pressure is above the threshold value, then the programmable logic device 100—more particularly, the application program(s) being executed therein—outputs a signal that causes the actuator 150, 160, 170 to open one or more bleed valves 110, 120, 130.

The programmable logic device 100 further includes a user interface 270, by which a system operator can view and also can utilize to effect changes to the system operation parameters, e.g., the threshold pressure value(s). Should the system 10 enter into alarm, this condition preferably is visually indicated on the user interface 270, which also can be used to adjust fail-safes, set points, trigger points and engine trip conditions.

The user interface 270 is attached to or in communication with the programmable logic device 100, or is remotely located therefrom (e.g., a wireless interface). Preferably, but not necessarily, the user interface 270 includes security features (e.g., key lockout, password protection) to restrict access thereto and, thus, to the system 10 as well.

Optionally, but also preferably, the control cabinet 230 in which the programmable logic device 100 is located further includes a cabinet cooling system 280. In particular embodiments, if the temperature of the control cabinet 230 is not rectified to a given preset limit within a given period of time, then the system 10 is configured so as to be put into a high temperature alarm state/mode and to trip the engine 40 if the maximum temperature is sustained for a preset time.

The programmable logic device 100—more particularly, the application program(s) being executed therein—is set so as to establish several different modes of operation. Such operating modes include, but are not limited to a standard operation mode, a so-called "Water Wash" operation mode, and a a "Maintenance and Test"operation mode.

When set in the Maintenance & Test Operation mode, the system 10 can be completely self-tested, remotely diagnosed and/or programmed, calibrated, and/or manually operated. In the Water Wash Operation mode, the system 10 is set so as to operate by a remote (outside) signal, and will cycle a self-purge continuously during engine maintenance. The standard operation mode is what is described above, wherein the programmable logic device 100 controls the operation of the pneumatic control valve 140 as per predetermined and/or established operation protocols that have been stored in the memory of the programmable logic device.

As indicated in FIGS. 1 and 2, the control cabinet 230 in which programmable logic device 100 is housed is located outside of the engine containment cell 50. This, in turn, ensures that the programmable logic device 100 is separated from any engine vibration, and also allows the programmable logic device 100 to be located close to the various sensors and/or transducers that feed it information via signals. This proximity, in turn, avoids the need for remote I/O conversion of these signals.

The system 10 of the present invention is advantageous in that it is of modular design, and can be installed/retrofitted into an existing engine or engine site. To do so, for example, a single hole can be drilled through the engine containment wall 55 to serve as a passage for the tethering harness, and the control cabinet 230 is mounted to the exterior of the cell wall.

Two conduits are used to connect the control cabinet 230 to the engine control house or power source location. A first conduit is used to provide power (24VDC or 110VAC or Black Start 180VDC) to the control cabinet 230, and a second conduit is used for data transmission cabling of remote monitoring and or other input signals from the engine controls (N1 speed, N2 speed, vibration, trip or power off.

This system 10 also may be utilized in connection with a twin-pack (i.e., two engine) system. In that case, a remote control cabinet (now shown) is used, and an third conduit is run from the main control cabinet 230 to the remote control cabinet, which is located outside the containment wall of the second engine.

A remote control harness connects the main control cabinet to the remote control cabinet and provides station air to the remote solenoid valve manifold, and further provides shield signal wire to the programmable logic device 100 to allow the programmable logic device to be wired to the remote pneumatic control valve. The second engine and its plurality of (e.g., three) bleed valves are connected to the remote control cabinet by a tethering harness, e.g., just as the primary or first engine is connected to the main control cabinet via the bulkhead connectors.

The system of the present invention is highly advantageous as compared to conventional systems. Whereas conventional systems rely upon mechanical means to control the opening/closing of bleed valve, such actions are controlled by a programmable logic device in accordance with the present invention. Moreover, this system eliminates the need for dirty, moisture-laden compressor air from coming in fluid contact with the bleed valves, since the pressure of the engine is instead sensed electronically.

The system of the present invention also provides design and operational flexibility as compared to conventional bleed valve systems. For example, in conventional systems, the various bleed valves include different spring spacers and shims based on their position with respect to the engine. Thus, these valves could not be interchanged without also interchanging the internal parts that enabled them to adjust (i.e., open or close) in response to a specific pressure value. In contrast, the system of the present invention enables any bleed valve to be initially placed in (and later moved to) any location without necessitating any such adjustment, because the operation of the bleed valves is electronically—not entirely mechanically controlled.

Moreover, it was impractical (if not impossible) to adjust the "set" pressures at which conventional bleed valve open/ close during operation of the engine in which the bleed valves were incorporated. In stark contrast, the bleed valve system of the present invention allows for the valves to be opened/closed in response to a multiplicity of pressure values during operation of the engine in which the bleed valves are incorporated. The system of the present invention further allows a user to change these values (e.g., via the user interface) at any time during operation of the system.

Although the system of the present invention is primarily described herein as being applicable to industrial gas turbines, this shall not limit the scope and use of the present invention. It is contemplated that the system of the present invention is adaptable for other uses, include turbines used in airplanes, and turbines used in connection with other fixed and moving applications that occur at, above, or below sea level.

Moreover, the foregoing description of the invention is intended to be merely illustrative thereof, and it is understood that variations and modifications can be effected without departing from the scope or spirit of the invention as set forth in the following claims. All documents mentioned herein are incorporated by reference herein in their entirety.

What is claimed is:

1. A system for controlling the operation of gas turbine engine bleed valves, comprising:

first equipment adapted to sense the pressure of a gas turbine engine and to produce and send electronic signals representative the pressure of the gas turbine engine;

a control device adapted to receive and process the electronic pressure signals, and to output control signals responsive to the electronic pressure signals; and second equipment adapted to receive the control signals from the control device and to control operation of at least one bleed valve within the engine, the second equipment including:

a control valve manifold in communication a programmable logic device and adapted to receive the additional signals from the programmable logic device, wherein the control valve manifold is in communication with an air source and includes at least one solenoid valve, and wherein the programmable logic device provides signals to the control valve manifold to control the opening and closing of the at least one solenoid valve such that at least some of the air supplied to the at least one solenoid valve by the air source will flow through the at least one solenoid valve when the at least one solenoid valve is open.

2. The system of claim 1, wherein the first equipment includes:

at least one pressure sensing line in communication with the gas turbine engine, such that pressure from the engine is carried through the at least one pressure sensing line.

3. The system of claim 2, wherein the first equipment further includes:

a pressure sensing manifold which is in communication with the at least one pressure sensing line; and at least one pressure transducer in communication with the pressure sensing manifold, wherein the at least one pressure transducer is adapted to produce and send electronic signals representative of the pressure of the gas turbine engine.

4. The system of claim 1, wherein the second equipment further includes:

at least one bleed valve actuator in communication with the control valve manifold such that air supplied to the control valve manifold will reach the at least one bleed valve actuator when the at least one solenoid valve is open, and wherein the at least one bleed valve actuator will operate at least one bleed valve in response to the air received by the bleed valve actuator.

5. A system for controlling the operation of gas turbine engine bleed valves, comprising:

first equipment adapted to sense the pressure of a gas turbine engine and to produce and send electronic signals representative the pressure of the gas turbine engine;

a control device adapted to receive and process the electronic pressure signals, and to output control signals responsive to the electronic pressure signals;

second equipment adapted to receive the control signals from the control device and to control operation of at least one bleed valve within the engine; and a user interface in communication with a programmable logic device, wherein the user interface is adapted for use by a user to modify operating parameters of the system.

6. A system for controlling the operation of gas turbine engine bleed valves, comprising:

first equipment adapted to sense the pressure of a gas turbine engine and to produce and send electronic signals representative the pressure of the gas turbine engine;

a programmable logic device adapted to receive and process the electronic pressure signals, and to output control signals responsive to the electronic pressure signals, the programmable logic device including at least one application program for execution therein, the at least one application program including instructions and criteria for:

(a) controlling the receipt of the electronic pressure signals;

(b) processing the electronic pressure signals; and (c) providing control signal outputs responsive to the electronic pressure signals; and second equipment adapted to receive the control signals from the programmable logic device and to control operation of at least one bleed valve within the engine.

* * * * *